Dec. 9, 1952
H. J. BALDWIN
2,620,714
UNDERGROUND FORKED SCRAPER-SHEAR
BAR FOR POWER-DRIVEN COLTERS
Filed April 15, 1949
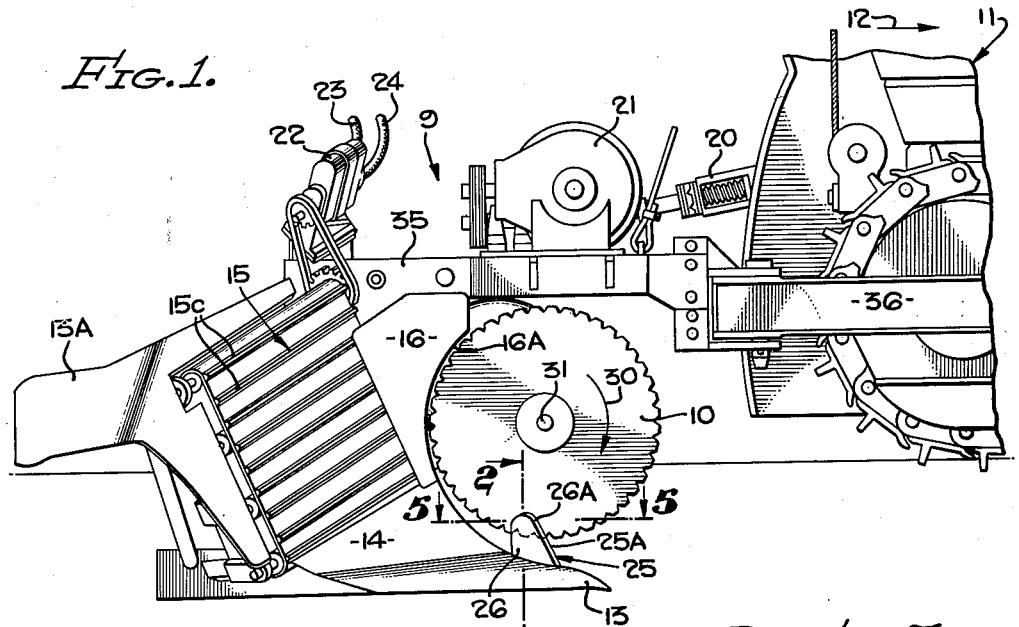
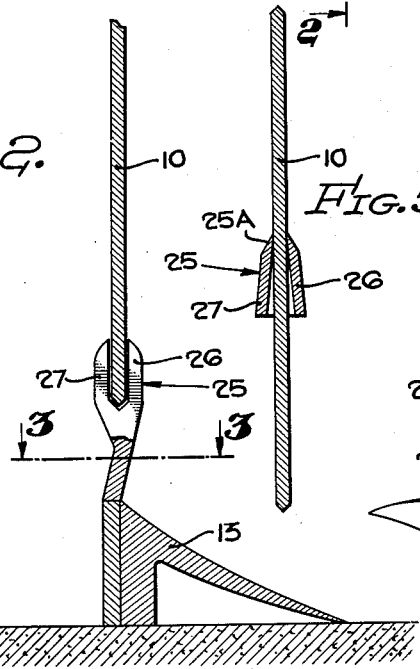
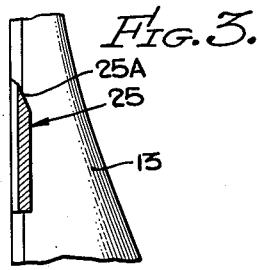
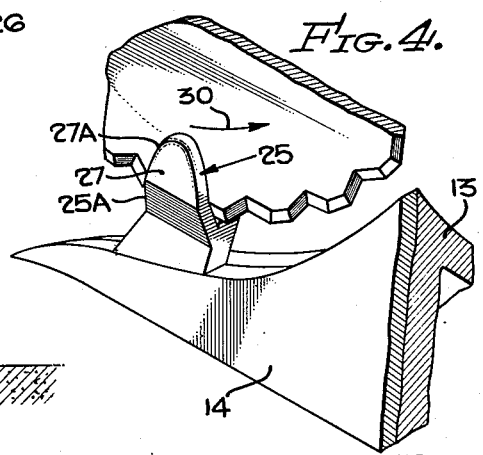
INVENTOR.
HENRY J. BALDWIN
BY
Lyon & Lyon
ATTORNEYS Patented Dec. 9, 1952

2,620,714

UNITED STATES PATENT OFFICE 2,620,714

UNDERGROUND FORKED SCRAPER-SHEAR BAR FOR POWER-DRIVEN COLTERS

Henry J. Baldwin, Paia, Territory of Hawaii, assignor to Pineapple Research Institute of Hawaii, Honolulu, Territory of Hawaii, an association of the Territory of Hawaii Application April 15, 1949, Serial No. 87,625

5 Claims. (Cl. 97—40)

1

The present invention relates to scraper-shear bars for use with power driven colters and is especially useful, for example, in plows sustaining much vegetation, particularly the "nonscouring" soils, of the type found in Hawaii, with a heavy cover of vegetative growth or plant residue such as pineapple ratoon plants or other debris on the surface thereof; although the present invention may likewise be embodied in other agricultural devices such as, for example, and not as a limitation, in subsoilers, fumigators, planters and in any agricultural device or implement with working elements in the soil where the soil fails to scour and/or where vegetative material is present either in or above the soil.

More specifically, the present invention relates to an improvement on the type of plow described and claimed in the copending patent application of Arnold B. Skromme, Serial Number 81,186, filed March 12, 1949, and assigned to the same assignee as the present application, although, as mentioned hereinabove, the present arrangement likewise has utility in other agricultural devices or implements.

Such plow, of the type shown and described in the above mentioned copending application, utilizes a power driven colter rotating adjacent a plowshare and partial moldboard arranged to carry the soil upward to a power driven moldboard from where such soil is carried further upwardly and outwardly to deposit the same substantially upside down in an adjacent furrow, thereby to assure that surface plants and trash are substantially covered by the soil originally underneath it.

The present invention relates to an improvement in this type of plow and consists essentially of the provision of an improved means acting between the moldboard and colter for purposes of improving the efficiency of operation, to assure cleaner cutting by the power driven colter and effective scraping of soil and debris from the surface of the rotating colter, and in general, to prevent the accumulation of soil, surface plants, trash and the like between the power driven colter and the beam or frame of the machine on which the colter is being used.

It is therefore one of the objects of the present invention to provide improved means acting between the colter and partial moldboard of the type of plow shown and claimed in the above mentioned copending application to achieve the desired results indicated in the paragraph immediately above.

A specific object of the present invention is to provide a forked scraper-shear bar mounted on a relatively stationary underground portion of the frame of an agricultural device or implement, of the character mentioned, with the forks of such scraper-shear bar partially embracing the adjacent rotating colter.

Another object of the present invention is to provide improved means, in a plow of the character described, for increasing the effectiveness of the power driven colter.

The features of the present invention which are believed to be novel are set forth with particularity in the appended claims. This invention itself, both as to its organization and manner of operation, together with further objects and advantages thereof, may be best understood by reference to the following description taken in conjunction with the accompanying drawings in which:

Figure 1 is a view in side elevation of a plow incorporating features of the present invention.

Figure 2 is a sectional view taken substantially on the line 2—2 of Figure 1.

Figure 3 is a sectional view taken substantially on the line 3—3 of Figure 2.

Figure 4 is a perspective view of a portion of the colter and partial moldboard structure taken from the side opposite the side shown in Figure 1.

Figure 5 is a sectional view taken substantially on the line 5—5 of Figure 1.

Although the present invention may be incorporated in many different types of agricultural devices and implements it is embodied, in its preferred form, in the plow shown in the drawings which is of the moldboard type with four principal components:

First, a large, sharp, power-driven, rotatable, flat colter 10 which is arranged to slice, in substantially a vertical plane, through surface debris, ratoon, and plants, and which is arranged also to cut into the ground to facilitate the separation of one furrow from another as the plow, having the general reference character 9, is pulled through the field by a power unit, such as a tractor 11, in the direction indicated by the arrow 12 in Figure 1; second, a large share 13 and partial moldboard 14 trails behind the colter 10 and digs under the furrow which the colter 10 has previously defined by its cutting. The share 13 and partial moldboard 14 have their ground engaging work surfaces contiguous and blending one into the other so as to initially produce shearing of the soil in a substantially horizontal plane under such furrow as well as vertically on that part of the landside of the furrow slice which the colter does not reach, and simultaneously gradually lifts a furrow slice to a position where it is acted upon by the third component comprising a power-driven endless conveyor moldboard 14.

The belt 15 may be of fabric reinforced rubber, metal, or other similar suitable material, and is arranged to receive the soil as it leaves the combination share-moldboard 13, 14 and to lift such soil upward and outward, in such a manner, that the furrow slice previously made by the action of the colter 10 and combination share-moldboard 13, 14 is turned sufficiently to bury the debris and the ratoon under the soil which was originally beneath such debris and ratoons. In order to facilitate and to assure such movement of the soil, a stationary wing moldboard 13A may be mounted, as shown in Figure 1, at the outside upper edge of the path of movement of the belt 15 to deflect and to guide the movement of the soil. Also, to assure the upward efficient movement of soils, cleats 15C may be affixed to the belt 15.

The fourth component is a combination soil shield and guide member 16 whose outer soil contacting surface is likewise contiguous with and blends into the soil engaging surface of the partial moldboard 14. This member 16 serves to prevent soil from entering in between the loop of the endless conveyor belt 15, and serves also to direct and to guide the flow of soil onto the endless conveyor moldboard belt 15. The leading edge 16A of this combination shield and guide member 16 lies substantially in the same plane as the plane of the disc colter 10 with such leading edge, as indicated in Figure 1, being progressively closer to the colter 10 in the direction upward from the ground. In other words, the leading edge 16A of the shield and soil guide member 16 defines with the adjacent periphery of the colter 10 an increasingly diminishing area for a purpose described more fully hereinafter. Briefly, the shield member 16 is, of course, relatively stationary with respect to the moving colter 10, and may serve as an "anvil" and shearing member against which imperfectly cut plant and ratoons may be subsequently pressed and sheared as the colter 10 rotates in the direction indicated by the arrow 30, to carry upwardly such ratoon which may be imperfectly cut against the edge 16A. This movement of the colter 10 is independent of the movement of the plow, as would not be the case if the colter were moved by ground traction, to thereby allow operation of the colter to free the plow and area of trash when the composite plow is standing still.

The colter 10 is power-driven other than by ground traction. For this purpose, the colter 10 may be driven from a power taken-off shaft of the tractor 11 through a slip clutch 20 and gear box 21 in a manner described specifically in the above mentioned copending application.

In such case, the cutting action of the colter 10 is substantially independent of the movement of the plow. Likewise, the movement of conveyor belt 15 is substantially independent of the movement of the plow and also substantially independent of the movement of the furrow slices contacting it.

An important feature of the present invention resides in a provision of a forked, scraper-shear bar having the general reference numeral 25, the prongs of which partially embrace the colter 10 and have sharpened leading edges. This member 25 has a sharp leading edge 25A as indicated in Figures 1 and 3. The outside prong of the forked colter 25 has the reference numeral 26, while the inside prong has the general reference numeral 27, each leading edge 26A, 27A of such prongs being preferably sharpened to increase the effectiveness of the cutting action which otherwise could be produced solely by the colter 10, or by the action of the colter 10 in pressing improperly cut ratoon against the edge 16A. It is observed from the drawings that the prongs 26, 27 converge forwardly (Fig. 5) with the leading edges of such prongs inclined upwardly and rearwardly in a direction towards the colter as shown in Fig. 1. The fork cleaver 25 is mounted, as for example by welding, to the share 13. It is noted that the colter 10 rotates in the direction indicated by the arrow 30 about the axis of the supporting shaft 31, which is preferably supported to rotate on a cantilever support, so as to avoid the presence of a bearing on that side of the plow shown in Figure 1. In other words, it is noted that one side of the colter 10 is free from shaft supporting elements, and such one side of the colter is adjacent the partial moldboard 14 and belt 15 between which elements there is free space within which there is no likelihood that ratoon imperfectly cut by the colter 10 may be jammed or clogged. For this reason, the cantilever support of the colter is preferred.

Preferably, the leading edge of the scraper 25 slopes upwardly and backwardly as shown in Figure 1 for use in soils with relatively few stones and many tough roots, in which case the roots slide up the scraper until they meet the rotating colter and are cut in two. In very rocky soils such leading edge may extend vertically without inclination to the rear, to cause rocks to teeter off the edge rather than be forced up against the colter. In either of such cases, preferably the two prongs of the scraper are so disposed that they are more widely separated at the back than at the leading edges as shown in Figure 5.

However, in order to prevent a large accumulation of improperly cut ratoon between the colter 10 and the leading edge 16A, or the beam, frame, or any other similar support member of the particular agricultural device or implement of the type mentioned herein, the scraper 25 is provided, which scraper coacts with the colter 10 to produce shearing of the ratoon or other debris therebetween.

The composite plow 9 is mounted on the plow frame 35. The plow frame 35 may be releasably connected to the tractor hitch frame 36 in the manner described in greater detail in the above mentioned copending patent application.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an agricultural device or implement of the character described having a power driven colter, the combination with said colter of a forked scraper shear bar having prongs partially surrounding a portion of the periphery of the colter adjacent the lowermost portion of said colter, the prongs of said forked scraper shear bar converging forwardly with their spacing at a minimum near their leading edges, and with such leading edges inclined upwardly and rearwardly in a direction toward the colter, and means mounting and rotating said colter at a speed substantially independent of the speed of said device with respect to the ground.

2. In an agricultural device or implement of the character described for conditioning soil having a thick vegetative growth thereon, a power driven colter, a share and partial moldboard arranged to lift and to turn a strip of soil previously defined by the cutting action of said colter to form a furrow, a power driven conveyor moldboard arranged to receive the strip of soil as it comes up from the share and partial moldboard and to carry it upward and outward to deposit it substantially upside down in an adjacent furrow, thereby to assure that surface plants and trash are substantially covered by the soil originally underneath it, and a scraper shear bar mounted stationarily with respect to said colter and adjacent thereto to produce a shearing action therebetween at the periphery of said colter, and means mounting and rotating said colter with a portion thereof below the surface of the soil, the last mentioned means comprising means for rotating said colter at a speed substantially independent of the speed of movement of said device with respect to the soil.

3. In an agricultural device or implement of the character described for conditioning soil having a thick vegetative growth thereon, a colter arranged to cut through plants and soil to thereby define a strip or furrow, means disposed aft of said device and arranged to shear, lift, and at least partially turn said strip of soil defined by said colter, a power driven conveyor arranged to receive the soil as it comes up from the last mentioned means and to carry the soil upward and outward, depositing it substantially upside down in an adjacent strip, thereby assuring that surface trash and plants are substantially covered by the soil originally underneath it, and a stationarily mounted forked scraper member partially embracing said colter to produce a shearing action therebetween, and means mounting and rotating said colter with a portion thereof below the surface of the soil, the last mentioned means comprising means for rotating said colter at a speed substantially independent of the speed of movement of said device with respect to the soil.

4. In an agricultural device or implement of the character described for conditioning soil having a thick vegetative growth thereon, the subcombination comprising a power driven colter, a movable conveyor moldboard cooperating with said colter to convey and direct the flow of earth into a furrow adjacent to the furrow defined by the colter, means conveying the earth sliced by said colter to said conveyor moldboard and a forked scraper member having prongs partially embracing the periphery of said colter to produce a shearing action therebetween, and means mounting and rotating said colter with a portion thereof below the surface of the soil, the last mentioned means comprising means for rotating said colter at a speed substantially independent of the speed of movement of said device with respect to the soil.

5. The arrangement set forth in claim 1 in which said leading edges are sharpened.

HENRY J. BALDWIN.

REFERENCES CITED

The following references are of record in the file of this patent:

UNITED STATES PATENTS

| Number | Name | Date |
| --- | --- | --- |
| 284,810 | Bunch | Sept. 11, 1883 |
| 989,224 | Barnes | Apr. 11, 1911 |
| 1,395,637 | Graves | Nov. 1, 1921 |
| 1,520,741 | Adamy | Dec. 30, 1924 |
| 1,873,128 | Johnson | Aug. 23, 1932 |

FOREIGN PATENTS

| Number | Country | Date |
| --- | --- | --- |
| 71,903 | Austria | June 10, 1916 |
| 40,681 | Denmark | Aug. 15, 1929 |